US012670653B2

(12) United States Patent
Filippov et al.

(10) Patent No.: US 12,670,653 B2
(45) Date of Patent: Jun. 30, 2026

(54) SYSTEM AND METHOD FOR THE 3D THERMAL IMAGING CAPTURING AND VISUALIZATION

(71) Applicant: , West Valley City, UT (US)

(72) Inventors: Andrey N. Filippov, West Valley City, UT (US); Olga Filippova, West Valley City, UT (US)

(73) Assignee: Elphel, Inc., West Valley City, UT (US)

( * ) Notice: Subject to any disclaimer, the term of this patent is extended or adjusted under 35 U.S.C. 154(b) by 308 days.

(21) Appl. No.: 18/469,885

(22) Filed: Sep. 19, 2023

(65) Prior Publication Data

US 2024/0104823 A1     Mar. 28, 2024

Related U.S. Application Data

(60) Provisional application No. 63/409,004, filed on Sep. 22, 2022.

(51) Int. Cl.
G06T 15/04 (2011.01)
G02B 27/01 (2006.01)
(Continued)

(52) U.S. Cl.
CPC .......... G06T 15/04 (2013.01); G02B 27/0172 (2013.01); G06T 3/40 (2013.01);
(Continued)

(58) Field of Classification Search
CPC .. G06T 15/04; G06T 3/40; G06T 3/60; G06T 7/50; G02B 27/0172; G06V 10/44;
(Continued)

(56) References Cited

U.S. PATENT DOCUMENTS

| | | | |
|---|---|---|---|
| 2022/0295038 A1* | 9/2022 | Venkataraman | ..... H04N 13/271 |
| 2024/0087094 A1* | 3/2024 | Newman | ............. H04N 13/271 |
| 2024/0291957 A1* | 8/2024 | Atkins | ................... G06T 15/20 |

OTHER PUBLICATIONS

Filippov A, Dzhimiev O. Long Range 3D with Quadocular Thermal (LWIR) Camera. arXiv preprint arXiv:1911.06975, 2019•arxiv.org Nov. 2, 20191 (Year: 2019).*

(Continued)

*Primary Examiner* — Michael Le

(74) *Attorney, Agent, or Firm* — Thorpe North & Western

(57) ABSTRACT

A system and method for navigation in complete darkness with thermal imaging and virtual-reality headset provide adjustable-base stereopsis and maintain long-range situational awareness. Such a system includes a multiple-aperture thermal imaging subsystem with non-collinear sensors with parallel optical axes and an image processing device, resulting in a significantly more accurate depth map than perceived with a normal human stereo acuity from a pair of raw thermal images. The stereo-video presented to the user is synthetic, allowing vantage point and stereo-base adjustment; it augments natural objects' texture with the generated one to allow a 3D perception of the negative obstacles and other horizontal features that do not provide stereo cues for the horizontal binocular vision. Additional wide-field-of-view thermal sensors may be used to compare current real-world views with the predicted from the earlier captured 3D data to communicate results to the user and supplement the 3D model with the structure-from-motion algorithm.

6 Claims, 8 Drawing Sheets

(51) Int. Cl.
| | |
|---|---|
| *G06T 3/40* | (2024.01) |
| *G06T 3/60* | (2024.01) |
| *G06T 7/50* | (2017.01) |
| *G06V 10/44* | (2022.01) |
| *H04N 13/275* | (2018.01) |

(52) U.S. Cl.
CPC .................. *G06T 3/60* (2013.01); *G06T 7/50* (2017.01); *G06V 10/44* (2022.01); *H04N 13/275* (2018.05)

(58) Field of Classification Search
CPC ...... G06V 10/143; G06V 20/20; G06V 20/64; H04N 13/275; H04N 13/254; H04N 13/271; H04N 2013/0081
See application file for complete search history.

(56) References Cited

OTHER PUBLICATIONS

Filippov A, Dzhimiev O. Long Range 3D with Quadocular Thermal (LWIR) Camera. arXiv preprint arXiv: 1911.06975, 2019•arxiv.org Nov. 21, 2019 (Year: 2019).*
Filippov A, Dzhimiev O. See far with TPNET: a Tile Processor and a CNN Symbiosis. arXiv preprint arxXiv: 1811.08032. Nov. 20, 2018 (Year: 2018).*

* cited by examiner

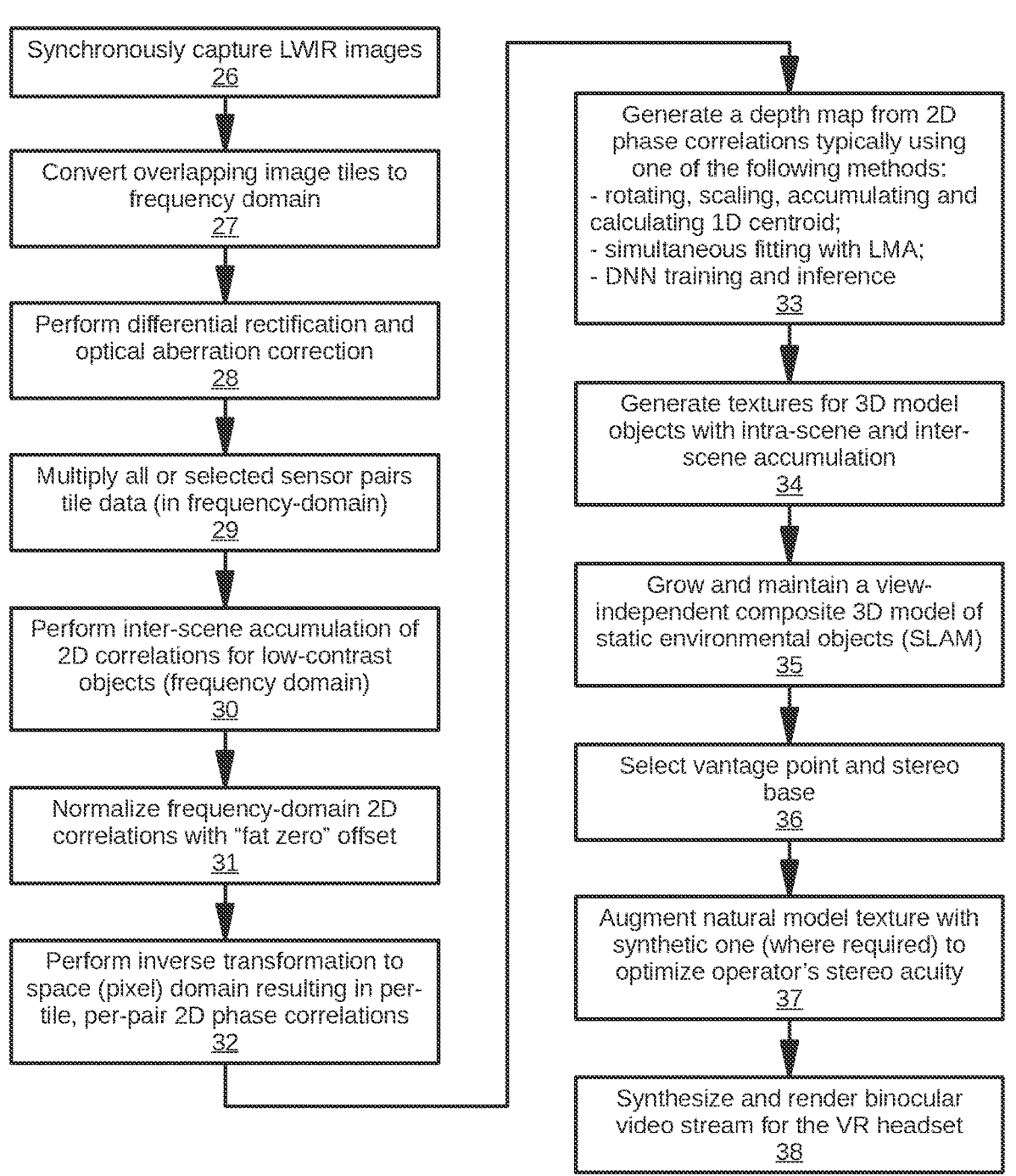

Synchronously capture LWIR images
26

Convert overlapping image tiles to frequency domain
27

Perform differential rectification and optical aberration correction
28

Multiply all or selected sensor pairs tile data (in frequency-domain)
29

Perform inter-scene accumulation of 2D correlations for low-contrast objects (frequency domain)
30

Normalize frequency-domain 2D correlations with "fat zero" offset
31

Perform inverse transformation to space (pixel) domain resulting in per-tile, per-pair 2D phase correlations
32

Generate a depth map from 2D phase correlations typically using one of the following methods:
- rotating, scaling, accumulating and calculating 1D centroid;
- simultaneous fitting with LMA;
- DNN training and inference
33

Generate textures for 3D model objects with intra-scene and inter-scene accumulation
34

Grow and maintain a view-independent composite 3D model of static environmental objects (SLAM)
35

Select vantage point and stereo base
36

Augment natural model texture with synthetic one (where required) to optimize operator's stereo acuity
37

Synthesize and render binocular video stream for the VR headset
38

FIG. 8

SYSTEM AND METHOD FOR THE 3D THERMAL IMAGING CAPTURING AND VISUALIZATION

CROSS-REFERENCE TO RELATED APPLICATIONS

This application claims the benefit of U.S. Provisional Application No. 63/409,004, filed on Sep. 22, 2022, which is hereby incorporated herein by reference in its entirety.

FIELD OF THE INVENTION

The field of the invention is triangulation-based thermal (Long Wave Infrared (LWIR)) 3D perception with uncooled microbolometer-based sensors and scene visualization with binocular virtual reality (VR) headset.

The invention relates to the passive means of 3D reconstruction without any ambient or artificial illumination, incremental generation of the 3D model of the environment, and synthesizing binocular video stream for optimal stereopsis with adjustable stereo base, vantage point, and augmented texturing of the horizontal features and smooth objects that provide low binocular depth cues.

The invention can be used for first responders and dismounted personnel in the degraded visual environment, including complete darkness, and operating ground and aerial vehicles.

BACKGROUND OF THE INVENTION

The eXtended Reality (XR) wearable systems are the topics of active research and development. A typical such system (Thales TopOwl® helmet [O. Lemoine, J. C. Ebert, F. Saviot, M. Charbonneau, and B. Coumert, "Topowl night vision improvements," in *Head-and Helmet-Mounted Displays XIII: Design and Applications*, vol. 6955, pp. 43-50, SPIE, 20081) is shown in FIG. 1. It includes a pair of image intensifiers directly coupled] to the Augmented Reality (AR) headset: the left sensor night-vision sensor modules 1 providing video stream for the left eye through heads-up display 2, and the right one—for the right. Other systems [H. Hosokawa, O. Nomura, S. Yamashita. H. Yoshioka, and T. Ichikawa, "Head mounted system and information processing apparatus," Aug. 9, 2022. U.S. Pat. No. 11,409,102] include a processing unit and, in some embodiments—eye-tracking devices to present modified video streams or images to the user instead of the raw captured data.

Using thermal imagers and low-cost uncooled microbolometer-based LWIR sensors for head-mounted systems is desirable as it is operational in Degraded Visual Environment (DVE), including complete darkness, is not blinded by the incoming light, and does not require switching between day and night modes. The main limitations of this sensor modality are low contrast of the environmental objects (ground, roads, rocks, bushes) and high thermal inertia leading to motion blur. Current mitigation of the low contrast of thermal images is the fusion of the conventional night-vision devices for environmental features and thermal images of high-contrast humans and operating machinery, such as US Army ENVG-B devices.

Stereopsis is a natural ability to perceive scene depth from a pair of images registered by the eyes is an essential mechanism for maintaining 3D situational awareness for humans, and many optical devices try to use it by providing separate images for each eye. Normal human depth perception implies that the viewable binocular images have the same magnification as when visible directly and correspond to the two viewpoints with a horizontal distance equal to the human pupillary distance. While many systems employ the natural stereopsis, some depend on a hyper-stereopsis where displayed images correspond to wider than natural viewpoints. The stereo-photographers well-know this phenomenon as a way to demonstrate large and far objects (e.g., buildings, mountains) with depth far exceeding the natural human stereopsis limited by approximately 10 m. Hyperstereopsis can improve 3D perception, but in certain circumstances, it may cause misjudgment of the distances. In Thales TopOwl® (FIG. 1), the hyper-stereopsis is not the goal of the design—instead, the increased camera stereo baseline 3 between night-vision sensor modules 1 is defined by the helmet mechanical balance to preserve its center of mass; it exceeds the pupillary distance 4 by almost six times. The hyperstereopsis confused helicopter pilots during landing as they perceived the ground closer than it was actually [G. W. Stuart, S. A. Jennings, M. E. Kalich, C. E. Rash, T. H. Harding, and G. L. Craig, "Flight performance using a hyperstereo helmet-mounted display: Adaptation to hyperstereopsis," in *Head-and Helmet-Mounted Displays XIV: Design and Applications*, vol. 7326, pp. 47-53. SPIE, 2009].

SUMMARY OF THE INVENTION

As a method to simultaneously overcome the limitations of the prior art and to achieve objects of the invention, we arrange a plurality of the uncooled LWIR nominally identical image sensors with parallel optical axes in a non-collinear pattern (e.g., along the lateral circumference of a helmet), a processing unit capable of generating a dense and accurate depth map from the registered thermal images even in low-contrast and DVE by typically implementing intrascene and interscene accumulation of the 2D phase correlations in the frequency domain, and a 3D headset capable of rendering the synthetic binocular video stream for the user. The processing unit starts from the per-scene (simultaneously captured set of thermal images) depth maps; and then uses simultaneous localization and mapping (SLAM) functionality to incrementally generate a view-independent 3D model that includes objects' textures produced simultaneously by fusing the 3D model with a sequence of aberration-corrected thermal images. The processing unit uses the textured 3D model to generate a binocular video stream, making provisions for desirable variable magnification, vantage point, and stereo baseline under full or partial user control or automatically. The processing unit supplements natural objects' textures with synthetic ones to increase the stereo acuity. In certain embodiments, the plurality of the head-mounted LWIR sensors is augmented or replaced with the vehicle-mounted ones; such configurations utilize the inertial measurement unit (IMU) functionality of the VR headset to modify synthetic video streams to match the user's head orientation. Yet, in other embodiments, the forward-looking thermal sensors are supplemented with side-looking ones, typically having wide-field of view (FoV); these additions notify the user of the mismatches between the 3D model and the actual side views and augment the model with short-range Structure-from-Motion (SfM) methods.

The invention accordingly comprises the several steps and the relation of one or more of such steps with respect to each of the others, and the typical apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 8 illustrates method of LWIR image capturing and visualization.

DETAILED DESCRIPTION OF THE PREFERRED EMBODIMENTS

Definitions

AR is an augmented reality.

DCT is a discrete cosine transform.

differential rectification herein is a method of image rectification preceding image matching. Instead of the traditional full rectilinear rectification, the differential rectification reduces the required correction amount by transforming each image to the average distortion of all the participating images, thus replacing the warping with the small shifts of the image tiles performed in the frequency domain. Details of this method are described in [A. Filippov, "Method for the FPGA-based long range multi-view stereo with differential image rectification," Apr. 28, 2020. U.S. Pat. No. 10,638,109 B2].

disparity herein is an offset (in pixels) between the projections of the same object registered by the two cameras.

DNN is a deep neural network.

DST is a discrete sine transform.

DVE is degraded visual environment.

FoV is a field of view.

image tile herein is a square window typically 16 pix×16 pix positioned on a twice denser grid (here 8 pix×8 pix), overlapping with the neighbor tiles. Image tiles are processed as a whole during frequency-domain conversion, aberration correction, and 2D phase correlation.

IMU is an inertial measurement unit that provides information about its orientation, position in space, angular and linear velocities and accelerations.

Interscene herein relates to the images or processed data (e.g. intrascene 2D correlations) acquired at different times.

intrascene herein relates to the simultaneously acquired images by multiple cameras.

LMA is Levenberg-Marquardt algorithm.

LWIR is long-wave infrared radiation in the range of 8-15 μm.

MCLT is a modified complex lapped transform—invertible transform to/from frequency domain based on Discrete Cosine Transform (DCT) and Discrete Sine Transform (DST) type IV.

motion blur herein is a smear of the registered images caused by the camera or objects movement during the image exposure time. Typically motion blur in uncooled sensors is more difficult to correct than that of the conventional visible range sensors because the thermal inertia is equivalent to the shutter gradually opening and closing. In contrast, the electronic shutter of the conventional sensors has negligible on/off times.

pupillary distance is the distance measured in millimeters between the centers of the pupils of the eyes, typically 54 mm to 74 mm for adults.

SfM is structure-from-motion.

SLAM is simultaneous localization and mapping—the computational problem of constructing or updating a map of an unknown environment while simultaneously keeping track of an agent's location within it.

VR is a virtual reality.

XR is an extended reality.

Figure 1:
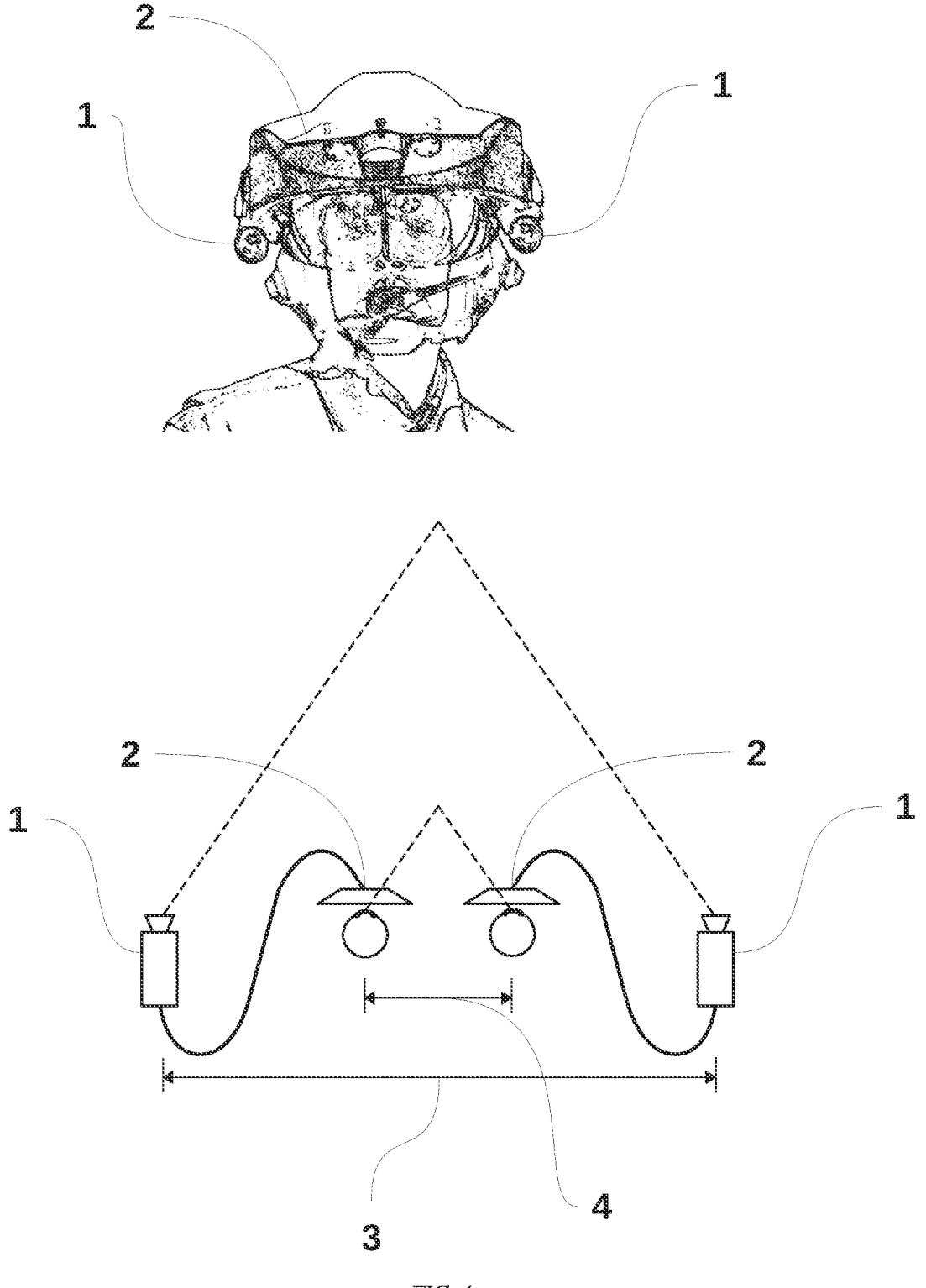
FIG. 1 shows hyperstereo night-vision Thales TopOwl® helmet (prior art)
Figure 2:
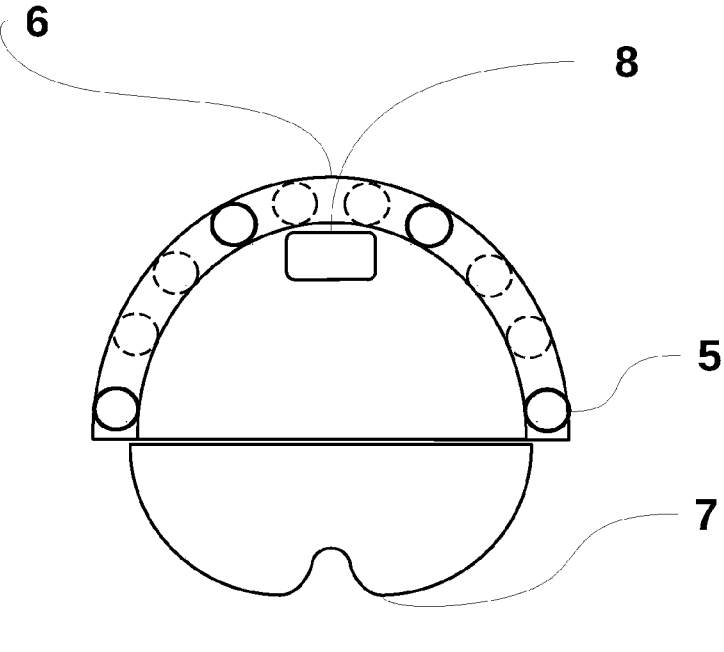
FIG. 2 shows wearable LWIR image capturing and 3D visualization system.
Figure 4:
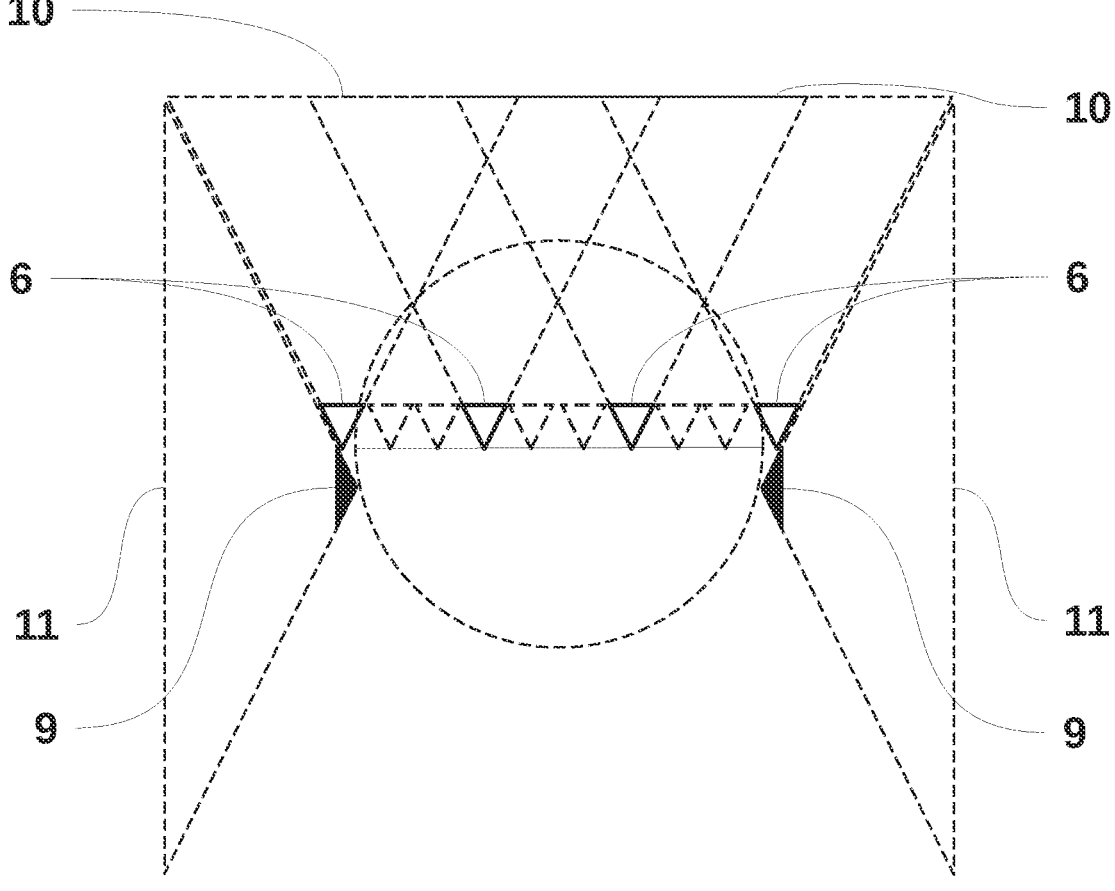
FIG. 4 shows top view of LWIR image capturing and 3D visualization system indicating FoV of the individual imaging modules.

The preferred embodiment of the invention, as illustrated in FIG. 2, comprises the non-collinear LWIR modules assembly 5 consisting of a plurality of LWIR imaging modules 6, the binocular VR headset 7, and the processing unit 8. LWIR imaging modules 6 should be nominally the same devices with the same resolution and lens focal length. The optical axes should be all parallel, as shown in FIG. 4, which indicates overlapping FoV of the forward-pointed LWIR imaging modules 10 and the number of modules should be at least four; the larger the number, the higher contrast gain is possible in the intrascene-only mode, and the better is the motion blur correction. The headset should be a pure VR device without an optical see-through option as implemented in many AR displays because the synthetic images rendered for the artificial stereopsis can not match the natural ones, the publication [G. W. Stuart. S. A. Jennings. M. E. Kalich, C. E. Rash, T. H. Harding, and G. L. Craig, "Flight performance using a hyperstereo helmet-mounted display: Adaptation to hyperstereopsis," in *Head-and Helmet-Mounted Displays XIV: Design and Applications*, vol. 7326. pp. 47-53. SPIE, 2009] mentions the need to use obscure inserts to block double-vision in TopOwl® helmet.

The preferred embodiment (the detailed operation shown in FIG. 8 is described later) operates in 3D, starting with a low latency current-scene depth map, improving accuracy by adding data from the earlier acquired scenes and resulting in a view-independent incrementally built 3D model of the environment.

There are two main methods for the vision-based 3D reconstruction of the environment: one is the SfM, which is possible with just a single moving camera, and the other uses multi-sensor rigs. The first method is capable of producing very accurate 3D models of static objects (e.g., buildings) because the distance between the viewpoints can be the same or exceed the linear dimensions of the object of interest, but it produces results after the camera system finishes the whole travel around the object. Applications that require low latency (e.g., while walking, driving, or flying) have to use the second method simultaneous image capturing by the plurality of the sensor modules. The disadvantage of this method is that because of the narrow camera baseline (limited mechanically by the helmet or vehicle size), the range accuracy quickly decreases with the distance: the absolute error increases as the squared distance. For example, if such a system can measure distance with 1 m resolution at 100 m, the same system at 1 km will have a range error of 100 m. The range accuracy degradation with distance matches the human stereo perception with similar characteristics, but the accuracy of the invented system is significantly (typically 10-100 times) higher than achievable by viewing the directly projected thermal images. This performance difference allows the synthetic binocular video stream generation with runtime-adjustable stereo base (including significant hyper-stereopsis) and virtual vantage point adjustment.

Figure 6:
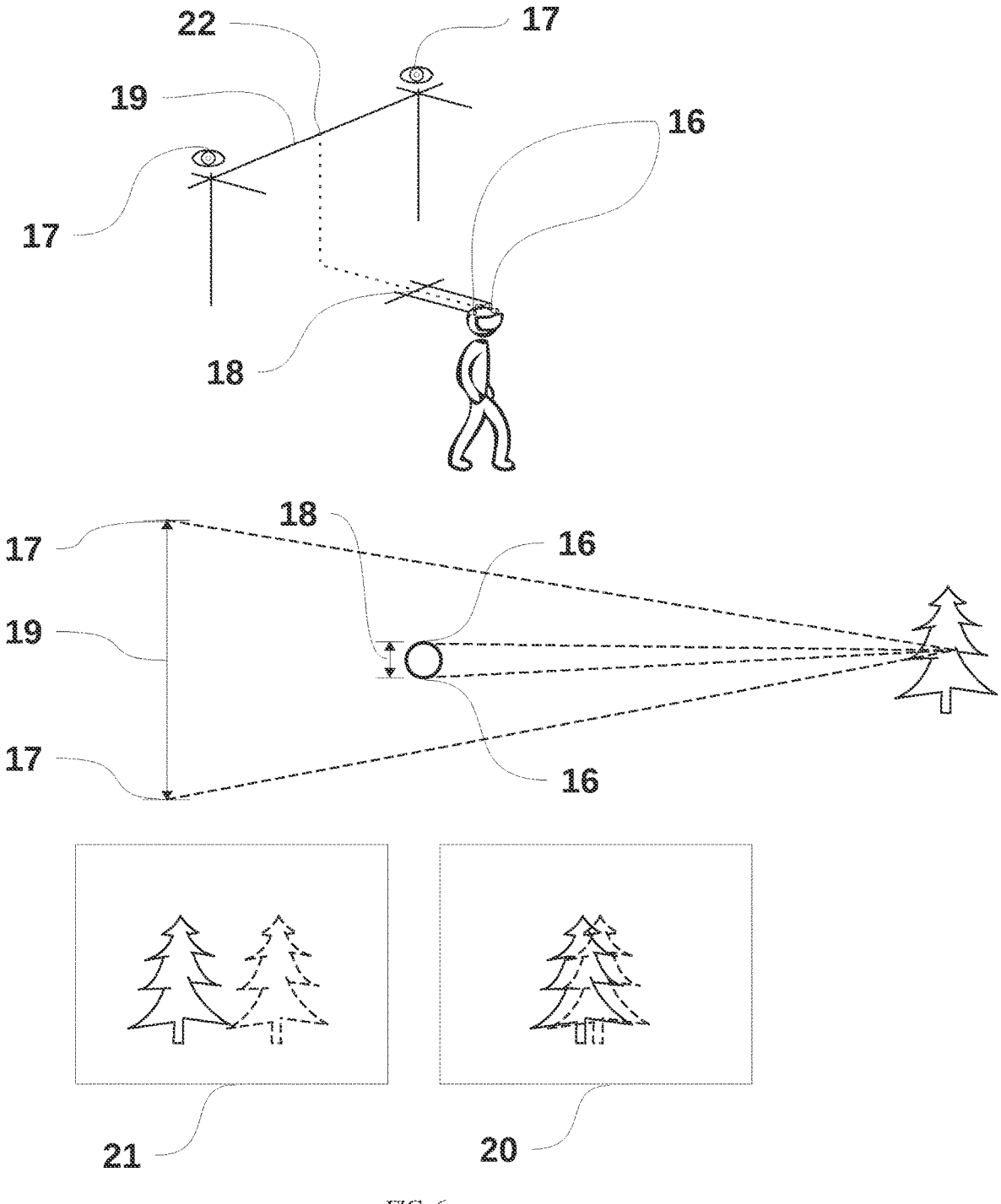
FIG. 6 illustrates generation of the virtual vantage point and stereo base.

Contrast improvement with the interscene consolidation of the 2D phase correlations as claimed in [A. Filippov, O. Dzhimiev, and O. Filippova, "Systems and methods for thermal imaging," Dec. 16, 2021. U.S. patent application Ser. No. 17/346,143] is a precondition for 3D perception usable in DVE, including complete darkness. High subpixel disparity resolution is essential for building a 3D model far exceeding human stereopsis acuity for a comparable stereo baseline. Such high 3D model accuracy, in turn, allows using hyper-stereopsis and vantage point modification with virtual viewpoints extending far beyond the physical camera dimensions (FIG. 6). The physical camera locations 16 fit within the physical camera stereo base 18, while the virtual cameras 17 may be located much farther from each other—at a virtual camera stereo base 19 (centered around vantage point 22). The physical camera view 20 (only two of all sensor views are shown) has a low disparity, while the synthetic virtual binocular view 21 is not limited to physical dimensions and may provide a hyper-stereopsis view when required. Contrast increase in the preferred embodiment occurs during intrascene and interscene accumulation of the 2D correlations in the frequency domain (leading to generation of dense and accurate depth map) rather than during direct accumulation of thermal images with parallax correction as suggested in [N. Högasten, M. Nussmeier, E. A. Kurth, T. R. Hoelter, K. Strandemar, P. Boulanger, and B. Sharp. "Imager with array of multiple infrared imaging modules," Oct. 2, 2018. U.S. Pat. No. 10,091,439]. Texture contrast improvement plays a secondary role in the preferred embodiment; textures are calculated using the depth maps and thermal images not only from multiple sensors but from multiple consecutive scenes captured at different times.

Figure 7:
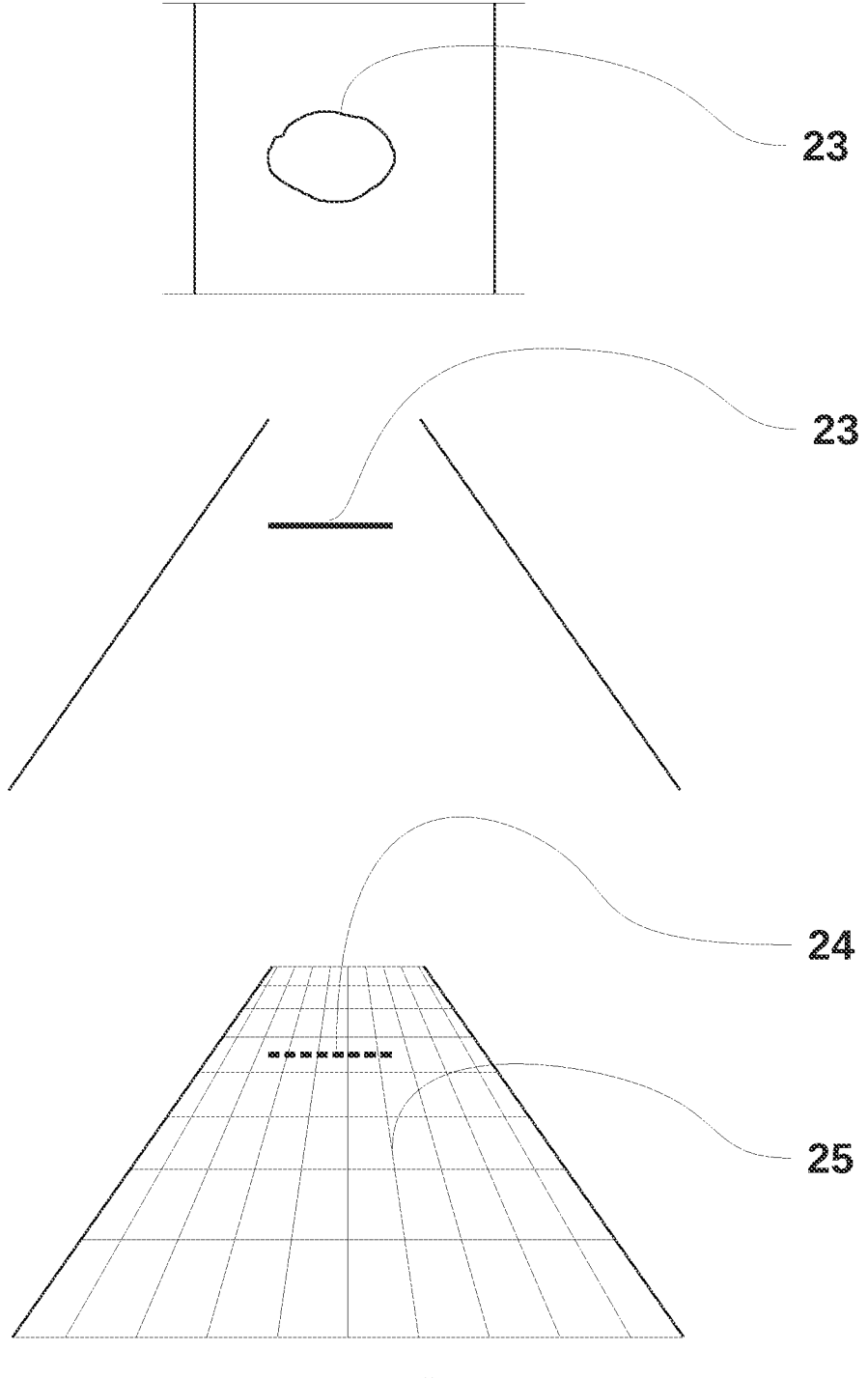
FIG. 7 illustrates application of synthetic textures.

FIG. 7 illustrates the application of synthetic textures. One case where the natural texture is inadequate is the representation of the horizontal objects, including so-called "negative obstacles" 23—dips in the road or edges of the road, trenches. From a distance, they look like horizontal lines, and the horizontal features do not provide stereo cues for horizontal binocular vision—a good match between the images is possible with a broad range of disparity values. The "negative obstacle" with synthetic texture 24 is similar to the gate arm at the railroad crossing—the colored stripes provide high visibility and stereo cues even when the arm is strictly horizontal. Another case where synthetic improves stereo acuity is viewing smooth objects such like pavement. The thermal images from a plurality of LWIR sensors processed with intrascene and interscene correlation accumulation provide sufficient contrast for depth perception, but such contrast is not enough for human stereopsis. Research [C. M. Schor and I. Wood, "Disparity range for local stereopsis as a function of luminance spatial frequency," *Vision Research*, vol. 23, no. 12, pp. 1649-1654, 1983] demonstrated that optimal human stereo acuity requires 3.0 cyc/° spatial frequency modulation with sufficient contrast, we can improve the 3D perception of the featureless object 25 by generating synthetic mesh or a random texture.

Figure 3:
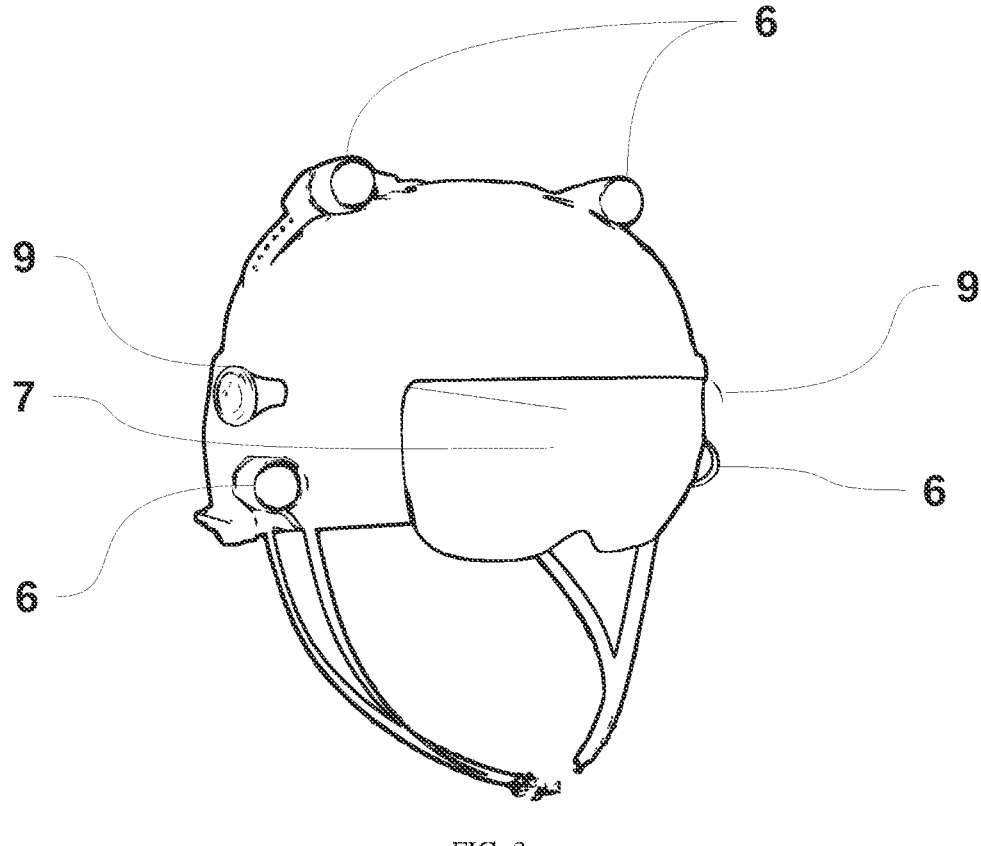
FIG. 3 shows wearable LWIR image capturing and 3D visualization system with two wide-FoV side-view LWIR imaging modules.

Another preferred embodiment includes supplemental thermal sensor modules (typically wide-FoV) pointed sideways, FIG. 3 shows FoV of the side-pointed LWIR imaging modules 11. There can be just two wide-FoV side-view LWIR imaging modules 9 (one right and one left or more to achieve higher resolution) and up to an entire 360° FoV. Typically there is no need to have multiple coaxial sensors for contrast enhancement, and the interscene-only mode is sufficient. These side-view sensor modules provide two functions to the system. The first is similar to the human peripheral vision, which detects view changes and movements with lower resolution than in a narrow-view foveal area, and the second augments the 3D model using the SfM algorithm. The processing unit 8 (FIG. 2) continuously compares a side-view sensor output with the synthetic view matching the incrementally built 3D model and notifies the user when the difference exceeds a certain threshold. The parts of the 3D model corresponding to the side-view modules use three sources: the earlier acquired images from the forward-looking sensor modules, objects registered with these modules while the user turns a head, and the SfM algorithm that processes the same side-view images.

Figure 5:
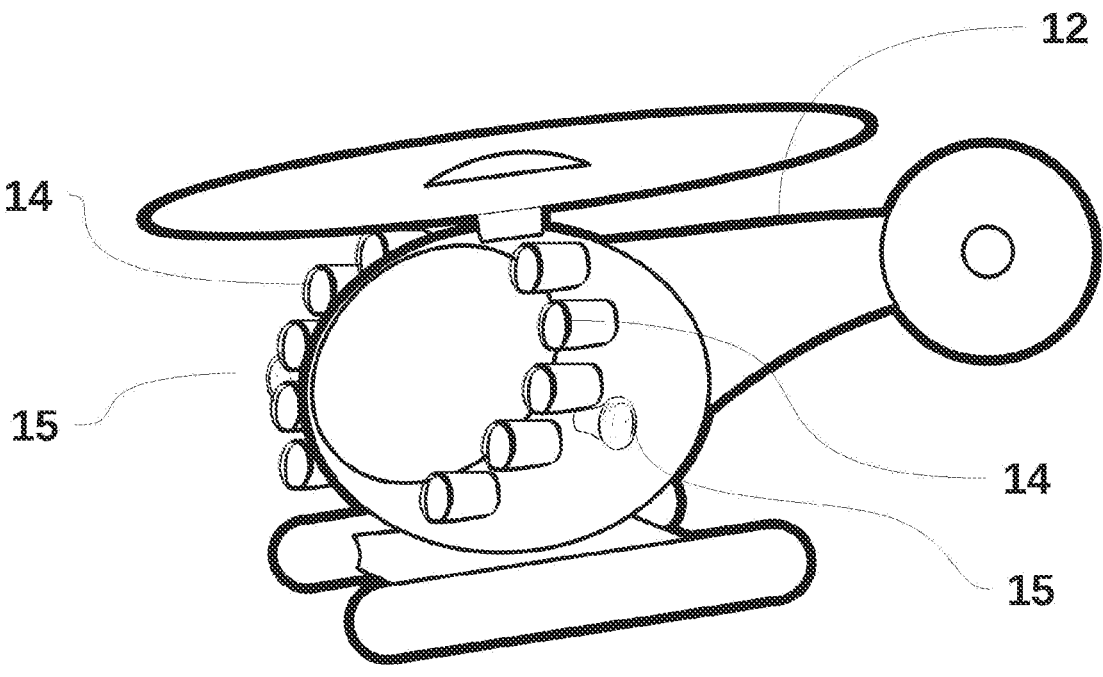
FIG. 5 illustrates aerial and ground vehicles with externally mounted LWIR imagers feeding data to the head-mounted VR devices.
Figure 5:
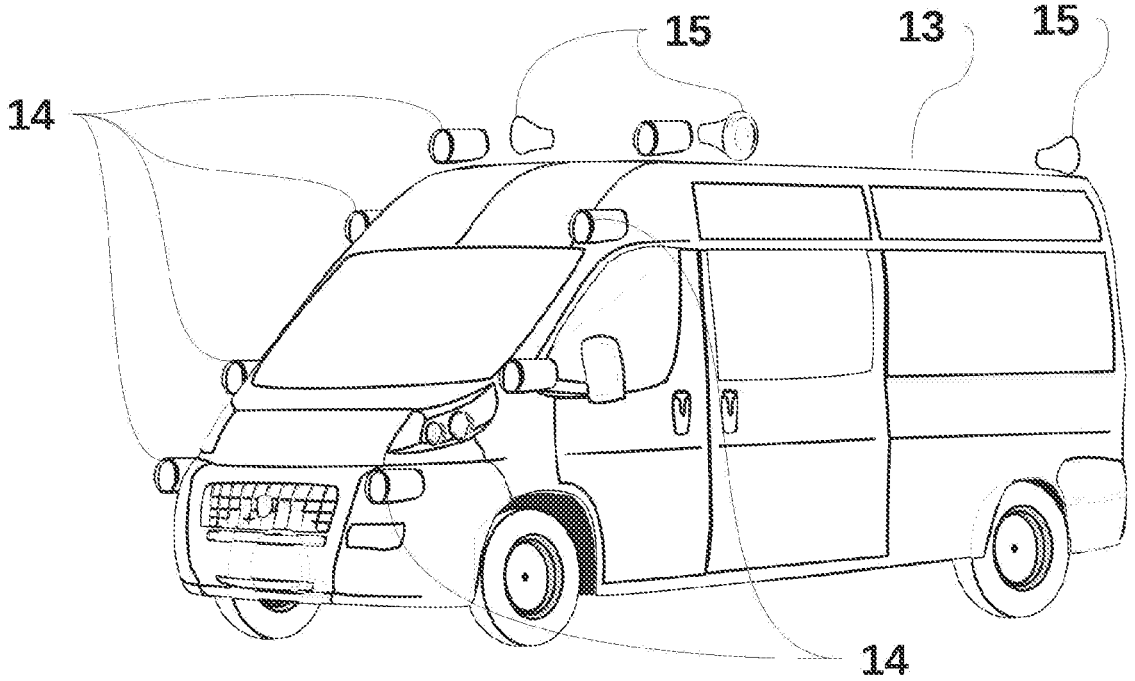

Another preferred embodiment of the invention illustrated in FIG. 5 comprises a non-collinear LWIR modules assembly 5 with a plurality of LWIR imaging modules 6 mounted on an aerial vehicle 12 or a ground vehicle 13 rather than on a helmet. Such vehicle-mounted modules may be used in addition to the helmet-mounted ones or instead of them. For example, the helmet-mounted thermal sensors are useless inside the helicopter because LWIR radiation can not go through glass. The vehicle-mounted sensors comprise a plurality of non-collinear external forward-looking LWIR imagers 14 and any number of external side (or backward)-looking LWIR imagers 15. With the helmet-mounted processing unit 8 receiving external image data over the wireless link, each crew member will view the individually rendered binocular video stream depending on the head orientation, gaze direction, and user preferences. As the sensor modules' optical axes are mechanically independent of the wearable helmet, the combination of the embedded into the VR IMU and the vehicle-mounted IMU provides relative orientation for video stream rendering.

The block diagram in FIG. 8 illustrates the processing steps of the invented method.

synchronously capture LWIR images 26;

convert overlapping image tiles to frequency domain 27, typically with Modified Complex Lapped Transform (MCLT);

perform differential rectification and optical aberration correction 28, prepare image tiles for pairwise 2D correlation;

multiply all or selected sensor pairs tile data (in frequency-domain) 29, using the multiplication-convolution property of the MCLT;

perform inter-scene accumulation of 2D correlations for low-contrast objects (frequency domain) 30;

normalize frequency-domain 2D correlations with "fat zero" offset 31;

perform an inverse transformation to space (pixel) domain resulting in per-tile, per-pair 2D phase correlations 32;

generate a depth map from 2D phase correlations typically using one of the following methods 33:

rotating, scaling, and calculating 1D centroid;

simultaneous fitting with Levenberg-Marquardt Algorithm (LMA);

Deep Neural Network (DNN) training and inference;

generate textures for 3D model objects with intra-scene and inter-scene accumulation 34;

grow and maintain a view-independent composite 3D model of static environmental objects with SLAM 35;

select vantage point and stereo base 36;

augment natural model texture with synthetic one (where required) to optimize operator's stereo acuity 37;

synthesize and render binocular video stream for the VR headset 38.

What is claimed:

1. A wearable imaging system comprising:

a plurality of four or more Long Wave Infrared (LWIRI imaging modules (sensor-lens assemblies) arranged in a non-collinear way maximizing horizontal and vertical parallax with nominally parallel optical axes;

a virtual reality (VR) headset with an ability to present a high-resolution stereoscopic view of the processed image data; and an image processing module device to input continuous video stream from the sensor modules;

extract depth information, consolidating data from multiple simultaneously captured image pairs (intrascene) and previously registered image pairs for the same static scene objects (interscene);

build and maintain a three dimensional (3D) scene model independent of a current field of view (FoV);

generate a synthetic binocular video stream with enhanced contrast and added texturing for the horizontal features and low-textured objects; and modify the vantage point and stereo base under user control;

the system further comprising:

two wide-Fo V thermal cameras covering the immediate surroundings of the user; and additional functionality of the image processing device to display wide-FoV view in the peripheral areas of the VR headset;

compare the predicted (from the maintained 3D scene model) and the actual camera views and notify user when the discrepancy exceeds the threshold; and use sideways-pointed wide-Fo V cameras to augment the 3D scene model with Structure-from-Motion (SfM) algorithms.

2. A wearable imaging system comprising:

a plurality of four or more Long Wave Infrared (LWIR) imaging modules (sensor-lens assemblies) arranged in a non-collinear way maximizing horizontal and vertical parallax with nominally parallel optical axes;

a virtual reality (VR) headset with an ability to present a high-resolution stereoscopic view of the processed image data; and an image processing device to input continuous video stream from the sensor modules;

extract depth information, consolidating data from multiple simultaneously captured image pairs (intrascene) and previously registered image pairs for the same static scene objects (interscene);

build and maintain a three dimensional (3D) scene model independent of a current field of view (FoV);

generate a synthetic binocular video stream with enhanced contrast and added texturing for the horizontal features and low-textured objects; and modify the vantage point and stereo base under user control;

the system further comprising:

a ground or an aerial vehicle-mounted plurality of four or more LWIR imaging modules arranged in the non-collinear way, maximizing horizontal and vertical parallax; and head-mounted inertial measurement unit (IMU) already available in most VR headsets to control the synthetic binocular video stream as the user changes head orientation relative to the ground or the aerial vehicle.

3. A method of three dimensional 3D thermal imaging and visualization comprising of:

synchronously capturing Long Wave Infrared (LWIR) images with a plurality of the nominally identical sensor modules with their optical axes oriented in the same direction and arranged in a non-collinear configuration; and processing the images:

synchronously acquiring LWIR images;

convert overlapping image tiles to the frequency domain, perform differential rectification and optical aberration correction using factory and field calibration data;

calculate pairwise two dimensional (2D) correlations for all or selected image pairs, keeping results in the frequency domain;

combine low-contrast data for static scene features from multiple frames:

current one and several previous ones applying appropriate geometric transformations dependent on the camera poses;

normalize frequency domain correlations with a "fat zero" off set defined by the number of scenes used;

perform inverse transformation from the frequency domain to the space (pixel) domain resulting in per-tile, per-pair 2D phase correlations;

generate a depth map from the 2D phase correlation using one of the following methods or a combination thereof:

rotating and scaling individual pairs' phase correlations matching relative positions of their sensors, accumulating the results and obtaining depth;

using Levenberg-Marquardt algorithm (LMA) or similar methods of simultaneous fitting the parametrized model to all available 2D phase correlations; or training and inferring a deep neural network (DNN) to output depth and depth confidence from an array of the 2D correlation tiles;

grow and maintain a view-independent 3D model of the static environment objects by fusing depth maps built for individual scenes;

prepare parameters for binocular stereo generation-select automatically or under user control optimal vantage point and stereo base not limited to physical sensor modules layout;

augment objects' textures with synthetic modulation to enable the 3D perception of the horizontal features such as most negative obstacles and to enhance the 3D perception of other low-textured objects; and synthesize binocular video stream using the 3D model and texture elements generated from a plurality of simultaneous views (intrascene) and previously acquired images (interscene) when intrascene-only contrast alone is insufficient.

4. The method of claim 3 further comprising:

image acquisition from two wide-FoV LWIR imaging modules pointed sideways (right and left, respectively);

generating synthetic views from the current state of the 3D model matching the physical views of the side-view imaging modules;

comparing synthetic and acquired images and notifying the user by blinking corresponding visualization elements in the peripheral areas of a VR headset or by other means when the difference exceeds a specified threshold; and augmenting the 3D model by processing data from the side-view imaging modules with Structure-from-Motion (SfM) algorithms.

5. The method of claim 3 further comprising:

image acquisition from a plurality of the vehicle-mounted (ground or aerial) nominally identical LWIR sensor modules with their optical axes oriented in the same direction and arranged in a non-collinear configuration used either simultaneously with the head-mounted ones or alone; and using inertial measurement unit (IMU) capability of the VR headset and the vehicle-mounted IMU to control binocular video stream generation matching user head orientation relative to that of the vehicle.

6. The method of claim 5 further comprising:

image acquisition from additional vehicle-mounted LWIR sensor modules or groups of sensor modules with the optical axes not parallel to the vehicle's forward direction; and augmenting the 3D model by processing data from the side-view imaging modules with Structure-from-Motion (SfM) algorithms.

\* \* \* \* \*